(12) United States Patent
Gross et al.

(10) Patent No.: US 10,699,007 B2
(45) Date of Patent: Jun. 30, 2020

(54) HYBRID UNIVARIATE/MULTIVARIATE PROGNOSTIC-SURVEILLANCE TECHNIQUE

(71) Applicant: Oracle International Corporation, Redwood Shores, CA (US)

(72) Inventors: Kenny C. Gross, Escondido, CA (US); Eric S. Chan, Fremont, CA (US); Dieter Gawlick, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 166 days.

(21) Appl. No.: 15/457,523

(22) Filed: Mar. 13, 2017

(65) Prior Publication Data

US 2018/0260560 A1 Sep. 13, 2018

(51) Int. Cl.
*H04L 29/06* (2006.01)
*G06F 21/55* (2013.01)
(Continued)

(52) U.S. Cl.
CPC .......... *G06F 21/552* (2013.01); *G06F 11/302* (2013.01); *G06F 11/3013* (2013.01);
(Continued)

(58) Field of Classification Search
CPC ............. G06F 21/552; G06F 17/30548; G06F 11/3048; G06F 11/3447; G06F 11/302;
(Continued)

(56) References Cited

U.S. PATENT DOCUMENTS

| 6,928,398 B1 * | 8/2005 | Fang ............... G06Q 10/06 703/2 |
| 7,243,265 B1 * | 7/2007 | Wookey ......... G06F 11/2252 714/37 |

(Continued)

OTHER PUBLICATIONS

Pang et al., Anomaly detection based on uncertainty fusion for univariate monitoring series, vol. 95, Jan. 2017, pp. 280-292, Elsevier Ltd. (Year: 2017).*

(Continued)

*Primary Examiner* — Carl G Colin
*Assistant Examiner* — Hany S. Gadalla
(74) *Attorney, Agent, or Firm* — Park, Vaughan, Fleming & Dowler LLP (57) ABSTRACT

The disclosed embodiments relate to a system for analyzing telemetry data. During operation, the system obtains telemetry data gathered from sensors during operation of a monitored system. Next, the system applies a univariate model to the telemetry data to identify an operational phase for the monitored system, wherein the univariate model analyzes an individual signal in the telemetry data without reference to other signals in the telemetry data. The system then selects a phase-specific multivariate model based on the identified operational phase, wherein the phase-specific multivariate model was previously trained based on telemetry data gathered while the system was operating in the identified operational phase. Finally, the system uses the phase-specific multivariate model to monitor the telemetry data to detect incipient anomalies associated with the operation of the monitored system.

16 Claims, 4 Drawing Sheets

(51) Int. Cl.
*G06F 11/30* (2006.01)
*G06F 11/34* (2006.01)
*G06N 20/00* (2019.01)
*G06F 16/2458* (2019.01)
*G06F 16/2455* (2019.01)

(52) U.S. Cl.
CPC ...... *G06F 11/3048* (2013.01); *G06F 11/3055* (2013.01); *G06F 11/3096* (2013.01); *G06F 11/3447* (2013.01); *G06F 16/2474* (2019.01); *G06F 16/24568* (2019.01); *G06N 20/00* (2019.01); *H04L 63/1408* (2013.01); *G06F 2221/034* (2013.01)

(58) Field of Classification Search
CPC ........... G06F 2221/034; G06F 11/3055; G06F 16/24568; G06F 11/3013; G06F 11/3096; G06F 16/2474; G06N 99/005; G06N 20/00; G06N 7/005; H04L 63/1408
See application file for complete search history.

(56) References Cited

U.S. PATENT DOCUMENTS

| | | | | |
|---|---|---|---|---|
| 9,984,334 | B2* | 5/2018 | Nikovski | G06N 20/00 |
| 2005/0188263 | A1* | 8/2005 | Gross | G06F 11/0751 |
| | | | | 714/25 |
| 2008/0082195 | A1* | 4/2008 | Samardzija | G05B 23/021 |
| | | | | 700/109 |
| 2010/0292959 | A1* | 11/2010 | Gross | G06F 11/141 |
| | | | | 702/181 |
| 2012/0128702 | A1* | 5/2012 | Weinschenk | G01N 33/574 |
| | | | | 424/184.1 |
| 2016/0094401 | A1* | 3/2016 | Anwar | H04L 41/142 |
| | | | | 709/223 |
| 2018/0189128 | A1* | 7/2018 | Qiao | G06N 7/005 |

OTHER PUBLICATIONS

Hill et al., Anomaly detection in streaming environmental sensor data: A data-driven modeling approach, vol. 25, Issue 9, Sep. 2010, pp. 1014-1022, Elsevier Ltd. (Year: 2010).*

Takeishi et al., Anomaly Detection from Multivariate Time-Series with Sparse Representation, pp. 2651-2656, 2014 IEEE International Conference on Systems, Man, and Cybernetics Oct. 2014, IEEE (Year: 2014).*

Zheng et al., Fluctuation Feature Extraction of Satellite Telemetry Data and On-Orbit Anomaly Detection, pp. 1-5, 2016 Prognostics and System Health Management Conference (PHM-Chengdu), IEEE (Year: 2016).*

Gardikis et al., Statistical-based Anomaly Detection for NFV Services, pp. 1-6, 2016 IEEE Conference on Network Function Virtualization and Software Defined Networks (NFV-SDN), IEEE (Year: 2016).*

* cited by examiner

HYBRID UNIVARIATE/MULTIVARIATE PROGNOSTIC-SURVEILLANCE TECHNIQUE

FIELD

The disclosed embodiments generally relate to prognostic-surveillance techniques, which are used to detect operational anomalies in time-series data. More specifically, the disclosed embodiments relate to a hybrid univariate/multivariate prognostic technique that can be used to detect anomalies in time-series data stored in a database.

RELATED ART

Computer systems are often used to analyze telemetry data to diagnose operational issues and, if necessary, issue warnings of impending problems. This telemetry data is often analyzed using sophisticated multivariate predictive analytics techniques, such as the "multivariate state estimation technique" (MSET) or other nonlinear, nonparametric (NLNP) regression techniques, to proactively detect incipient anomalies, such as impending failures or malicious-intrusion events. However, for many predictive analytics techniques, a monitored system might progress through different phases of operation, wherein each phase has different characteristics, and is hence preferably monitored using a different multivariate model. Although it is possible to use a single multivariate model to monitor the entire envelope of operation, the resulting prediction accuracy will be increased by using a separate trained model for each phase of operation.

Hence, what is needed is a technique that facilitates using different multivariate models to proactively detect anomalies in different phases of system operation.

SUMMARY

The disclosed embodiments relate to a system for analyzing telemetry data. During operation, the system obtains telemetry data gathered from sensors during operation of a monitored system. Next, the system applies a univariate model to the telemetry data to identify an operational phase for the monitored system, wherein the univariate model analyzes an individual signal in the telemetry data without reference to other signals in the telemetry data. The system then selects a phase-specific multivariate model based on the identified operational phase, wherein the phase-specific multivariate model was previously trained based on telemetry data gathered while the system was operating in the identified operational phase. Finally, the system uses the phase-specific multivariate model to monitor the telemetry data to detect incipient anomalies associated with the operation of the monitored system.

In some embodiments, while the system uses the phase-specific multivariate model to model the telemetry data, the system continues to apply the univariate model to the telemetry data. If the univariate model indicates that the monitored system has transitioned to a subsequent operational phase, the system selects a subsequent phase-specific multivariate model for the subsequent operational phase, and then uses the subsequent phase-specific multivariate model to monitor the telemetry data.

In some embodiments, the system obtains the telemetry data from a database that contains the telemetry data while processing a database query.

In some embodiments, applying the univariate model to the telemetry data involves applying multiple univariate models to the telemetry data to identify the operational phase for the monitored system.

In some embodiments, the phase-specific multivariate model is selected from a library containing multiple phase-specific multivariate models for multiple identified operational phases of the monitored system.

In some embodiments, the univariate model comprises a Symbolic Aggregate approXimation (SAX) univariate time-series classifier.

In some embodiments, the phase-specific multivariate model comprises a model that uses a nonlinear, nonparametric (NLNP) regression technique.

In some embodiments, the phase-specific multivariate model comprises a model that uses the multivariate state estimation technique (MSET).

In some embodiments, the telemetry data includes one or more of the following: data gathered from physical sensors in the monitored system; software-related telemetry parameters gathered from software in the monitored system; and control inputs for the monitored system.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Details

The disclosed embodiments provide a new prognostic-surveillance system that can monitor time-series obtained from a database, wherein the time-series data was originally ingested into the database from a monitored system with no real-time anomaly detection. This new prognostic-surveillance system integrates a univariate time-series prognostic technique with an advanced multivariate prognostic technique. During operation, this prognostic-surveillance system makes use of the univariate time-series prognostic technique to segment the time-series data based on temporal patterns into different "phases." The system then selects a phase-specific multivariate model for a given phase from a library, and uses the phase-specific multivariate model to subsequently monitor the time-series data during the given phase to detect incipient anomalies associated with the operation of the monitored system.

This new hybrid univariate/multivariate prognostic-surveillance technique has a number of advantages. It provides the ability to intelligently mine existing databases containing time-series signals and discover anomalies in associated monitored systems, processes, and sensors (even anomalies that were unknown when the data was originally ingested). It also provides a framework that enables a library of trained models to be applied in real time to new time-series data obtained directly from monitored systems.

The univariate time-series prognostic technique used by this hybrid system can involve using a Minimum Description Length (MDL) principle in conjunction with a Symbolic Aggregate approXimation (SAX) representation, such as minimum entropy based splitting, error-based splitting, and Keogh's matrix profile index, applied to univariate components, to identify the different operating phases. (See "Experiencing SAX: a novel symbolic representation of time series," Jessica Lin, et al., *Data Mining and Knowledge Discovery*, Volume 15, Issue 2, October 2007, pp. 107-144.)

Figure 1A:
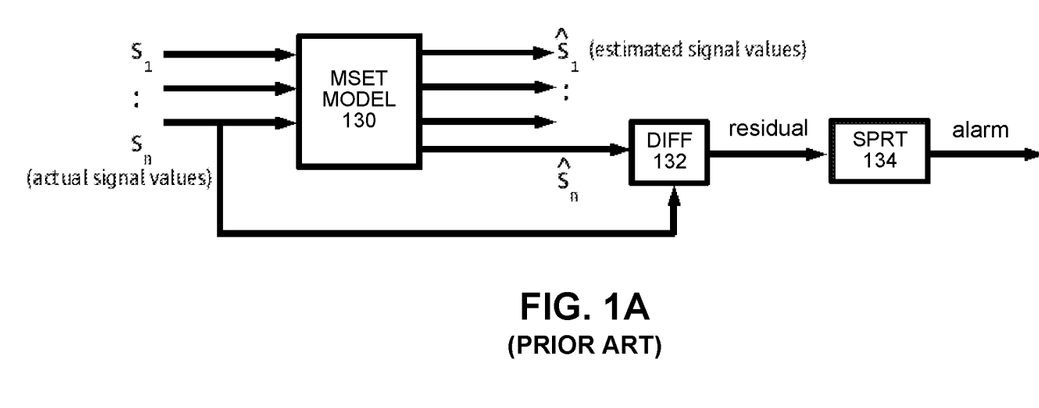
FIG. 1A illustrates a conventional data-driven prognostic-monitoring system.

The multivariate prognostic technique used by this hybrid system can include MSET. For example, some existing enterprise computer systems presently use MSET to proactively detect anomalies in enterprise servers, storage systems, and networks. More specifically, FIG. 1A illustrates how empirical data-driven prognostic monitoring is achieved in some existing electronic prognostics systems using MSET. Referring to FIG. 1A, for specific systems, processes, or assets under surveillance, there exists a collection of n time-series sensor signals, $S_1, S_2 \ldots S_n$, that are being monitored. These time-series signals feed into an MSET pattern-recognition model 130. Note that although MSET is used in the disclosed embodiments, the disclosed embodiments can generally use any one of a generic class of pattern-recognition techniques, such as nonlinear, nonparametric (NLNP) regression, which includes neural networks, auto-associative kernel regression (AAKR), and even simple linear regression (LR).

In the scheme illustrated in FIG. 1A, the MSET model 130 is "trained" to learn patterns of correlation among all of the monitored time-series signals $S_1, S_2 \ldots S_n$. This training process involves a one-time, computationally intensive calculation that is performed offline with accumulated data that contains no anomalies. The pattern-recognition system is then placed into a "real-time surveillance mode," wherein the trained MSET model 130 predicts what each signal should be, based on other correlated variables; these are the "estimated signal values" illustrated in FIG. 1A. Prognostic fault detection is achieved by using a differencing module 132 to perform a pairwise differencing operation between the actual signal values and the estimated signal values. The system then applies a "detection operation" to the residuals generated by the differencing operation by using a Sequential Probability Ratio Test (SPRT) module 134 to detect anomalies and possibly generate an alarm.

Exemplary System

Figure 1B:
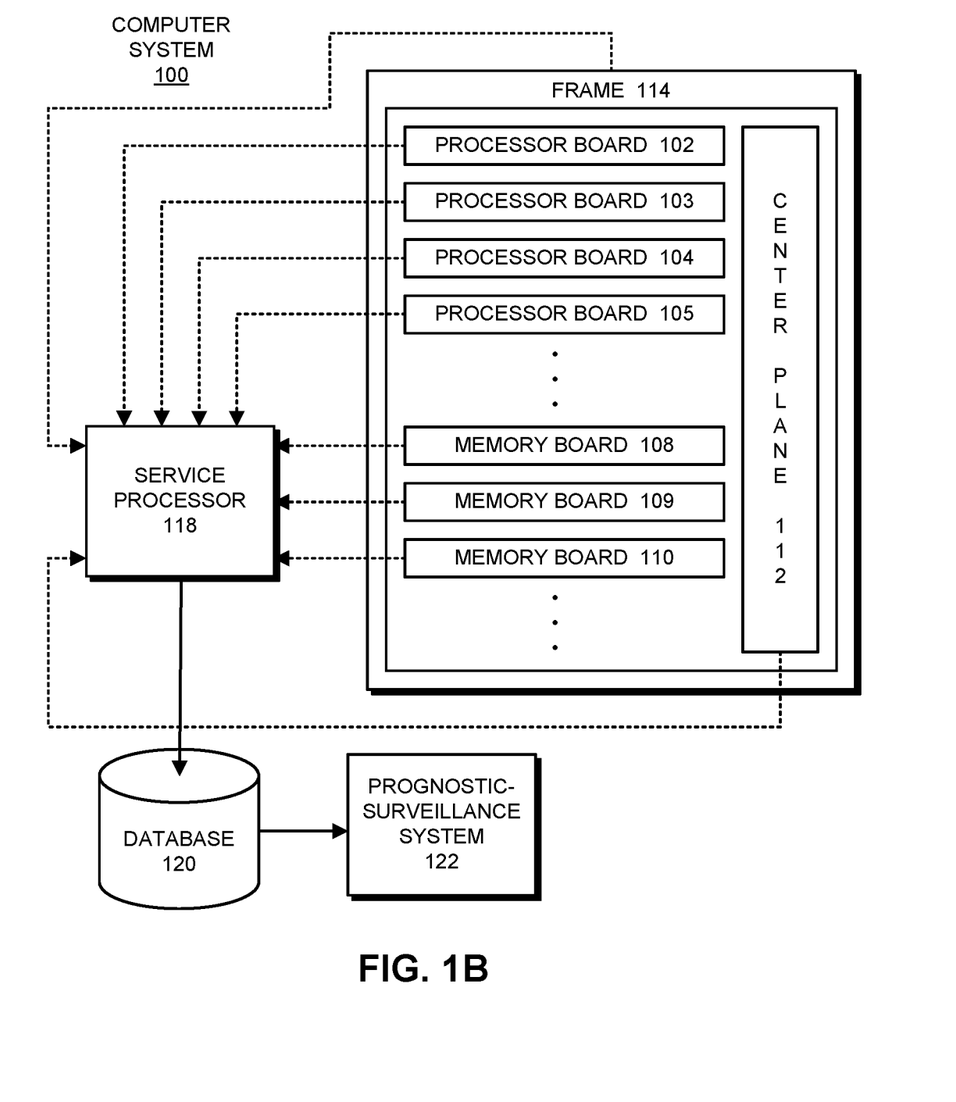
FIG. 1B illustrates an exemplary system that gathers, stores and processes telemetry signals in accordance with the disclosed embodiments.

FIG. 1B illustrates an exemplary computer system 100, which generates telemetry data that can be processed by a prognostic-surveillance system 122. (In general, the above-mentioned hybrid univariate/multivariate prognostic-surveillance technique is not limited to monitoring computer systems, and can generally be applied to monitor telemetry data generated by different types of monitored system, such as an aircraft, a nuclear reactor, a power plant.) The telemetry data gathered from computer system 100, which is illustrated by the dashed lines in FIG. 1B, can include telemetry data gathered from: an operating system in computer system 100, a set of sensors in computer system 100, and/or one or more external sensors that reside outside the computer system 100. As illustrated in FIG. 1B, computer system 100 includes a number of processor boards 102-105 and a number of memory boards 108-110, which communicate with each other through center plane 112. These system components are housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, and/or an application.

Computer system 100 is associated with a service processor 118, which can be located within computer system 100, or alternatively can be located in a standalone unit separate from computer system 100. Service processor 118 may include a monitoring mechanism that performs a number of diagnostic functions for computer system 100. One of these diagnostic functions involves gathering performance parameters from the various FRUs within computer system 100 and storing them in a database 120 to be analyzed by prognostic-surveillance system 122. Note that prognostic-surveillance system 122 can alternatively monitor the telemetry data in real-time, without first storing it in database 120.

The telemetry data is generated from hardware sensors and/or software monitors within computer system 100. (Note that the software monitors that generate telemetry signals are also referred to as "software sensors" or simply "sensors" within this specification and the appended claims.)

Figure 2:
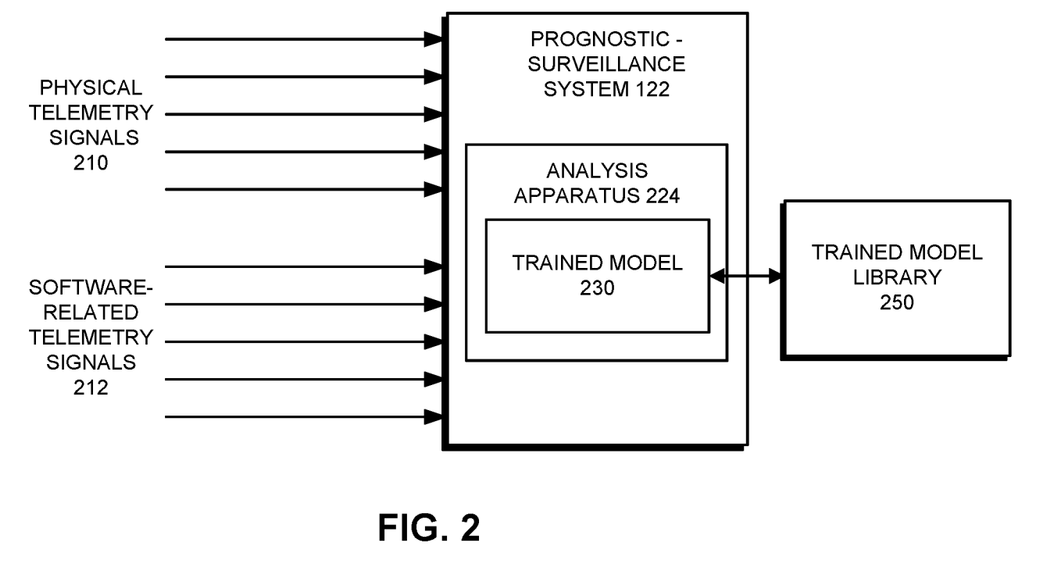
FIG. 2 illustrates an exemplary prognostic-surveillance system in accordance with the disclosed embodiments.

FIG. 2 illustrates how prognostic-surveillance system 122 performs prognostic-surveillance operations in accordance with the disclosed embodiments. As illustrated in FIG. 2, prognostic-surveillance system 122 monitors a number of telemetry signals, including physical telemetry signals 210 and software-related telemetry signals 212. In doing so, prognostic-surveillance system 122 uses an analysis apparatus 224, which makes use of a trained model 230 obtained from a trained model library 250.

Prior to analyzing telemetry signals 210 and 212, analysis apparatus 224 may aggregate and pre-process telemetry signals 210 and 212. Moreover, during pre-processing of telemetry signals 210 and 212, analysis apparatus 224 may synchronize disparate sampling streams by standardizing timestamps of telemetry signals 210 and 212 from different domains. Next, analysis apparatus 224 may transform telemetry signals 210 and 212 into signals with uniform sampling rates. For example, analysis apparatus 224 may use an analytical re-sampling process (ARP) to up-sample signals with slower sampling rates to match the highest sampling rates in the aggregation of monitored telemetry signals 210 and 212.

Analysis apparatus 224 may be trained using historical telemetry data from computer system 100 and/or similar computer systems. This historical telemetry data may be used to determine correlations among various telemetry signals 210 and 212 collected from the monitored computer system, wherein the correlations are embodied in a trained model 230 that can be used to detect incipient anomalies that arise during operation of computer system 200.

Analysis apparatus 224 may use a number of different univariate pattern-recognition techniques to segment the time-series data into different phases, such as a technique that uses a SAX univariate time-series classifier.

Moreover, analysis apparatus 224 may use a number of different phase-specific multivariate models to monitor the telemetry data. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines a number of different multivariate pattern-recognition approaches, which can be used by the disclosed embodiments, including Ordinary Least Squares (OLS), Support Vector Machines (SVM), Artificial Neural Networks (ANNs), MSET, or Regularized MSET (RMSET).

Framework

We have developed a new framework that includes a common declarative programming model to facilitate development of multivariate time-series analytics. This new framework performs prognostic operations using MSET and an associated functional data type for time-series. This functional data type not only provides an abstraction for time-series data but also serves as a data cleansing solution, wherein the quality of raw data translates into the quality of the query results.

MSET models can be augmented by semantic segmentation (regime/phase segmentation) to improve prognostic accuracy, thereby simultaneously enhancing a number of quantitative prognostic metrics, such as false-alarm probability (FAP), missed-alarm probability (MAP), and Time-To-Event. (TTE is a measure of the lead time for proactive identification of the onset or incipience of anomalous events.) However, note that it still remains possible to use MSET without differentiating among distinct operational phases in the monitored systems and processes.

The segmentation into operational phases can be illustrated by an example related to monitoring an airplane flight. One can simply train MSET on an entire airplane flight, and can then use MSET to monitor subsequent flights to detect anomalies in the engines, hydraulics, mechanical equipment, etc. In contrast, a system that uses a hybrid univariate/multivariate prognostic-surveillance technique first identifies separate "phases" of a flight, such as takeoff, cruising at constant altitude, and landing. Next, the system trains a phase-specific model for each of the identified phases. Finally, the system automatically swaps in trained phase-specific models for takeoff, cruising, landing. Note that by using these phase-specific models, the system achieves higher prognostic performance, which provides increased sensitivity for anomaly detection and FAP/MAP avoidance.

The described embodiments provide a solution that can be integrated with a DB query, wherein a query language can be used to select the regimes from a multivariate time-series. Moreover, the regimes can be abstracted as intervals (partitioning of a functional data type), which can be closed-open intervals denoted by [t1, t2) between valid times t1 and t2. Note that because the MSET-based functional data model can evolve through continual refinement of the intervals, it is desirable to use bi-temporal representation of the functional data type.

For example, assume we can define a functional data type for time-series data in the following pseudo data definition language (DDL):

```
CREATE TYPE SensorData AS OBJECT(measure NUMBER,
   t TimeStamp);
CREATE TYPE TimeSeries AS TABLE OF SensorData;
CREATE TABLE multivariate_time_series
   (pod_name VARCHAR(10),
   jvm_name VARCHAR(100),
   variable_name VARCHAR(100), data TimeSeries)
   NESTED TABLE data STORE AS series_table
   FOR EACH pod_name;
```

We now select a vector X(t) at a given 't' from a multivariate functional data type, segmented by "Keogh's Matrix Profile Index," wherein a state estimation is performed using MSET. The vector X(t) is estimated using the current knowledge of the phase changes and MSET model.

```
SELECT AT_TIME(f.data, '2016-03-07 17:18:00')
   FROM multivariate_time_series f
   WHERE f.pod_name = 'YAF' AND
      f.jvm_name = 'CRMDomain_SalesServer_1' AND
      f.variable_name IN ('CPU_usage', 'memory_usage',
      'disk_usage')
   PARTITION BY 'SAX-Matrix-Profile'
   ESTIMATION BY 'MSET'
```

With a bi-temporal database, we query the vector X(t) using the model we have learned as of 2016-05-31 15:00:00.

```
SELECT AT_TIME(f.data, '2016-03-07 17:18:00')
   FROM multivariate_time_series f
   WHERE f.pod_name = 'YAF' AND
      f.jvm_name = 'CRMDomain_SalesServer_1' AND
      f.variable_name IN ('CPU_usage', 'memory_usage',
      'disk_usage')
   PARTITION BY 'SAX-Matrix-Profile'
   ESTIMATION BY 'MSET'
   AS OF TIMESTAMP TO_TIMESTAMP('2016-05-31 15:00:00',
      'YYYY-MM-DD HH:MI:SS');
```

If we have queried the cumulative quantities (such as total memory usage, total CPU usage, and total network I/O) during the "BUSY HOURS" phase, this perception may need to be updated in light of the new knowledge of the phase changes and the MSET model.

Suppose we can select an interval from a functional data type for a given valid time interval:

```
SELECT AT_INTERVAL(f.data,
    TIME_INTERVAL('2014-03-07 11:18:00', '2014-03-07 12:18:00'))
    FROM multivariate_time_series f
    WHERE f.pod_name = 'YAF' AND
        f.jvm_name = 'CRMDomain_SalesServer_1' AND
        f.variable_name IN ('CPU_usage', 'memory_usage',
            'disk_usage')
    PARTITION BY 'SAX-Matrix-Profile'
    ESTIMATION BY 'MSET'
```

The following query may return rows of intervals classified by MDL.

```
SELECT INTERVALS(f.data)
    FROM multivariate_time_series f
    WHERE f.pod_name = 'YAF' AND
        f.jvm_name = 'CRMDomain_SalesServer_1' AND
        f.variable_name IN ('CPU_usage', 'memory_usage',
            'disk_usage')
    PARTITION BY 'SAX-Matrix-Profile'
    ESTIMATION BY 'MSET'
```

Note that this new technique can be used to express increasingly complex queries such as:
1. select an anomalous pattern in an interval;
2. match one anomalous pattern, such as "abnormally high memory usage" in one interval followed by an "out of memory event" in a subsequent interval;
3. use MSET to distinguish sensor degradation from real process anomalies in the monitored assets; etc.

Process

Figure 3:
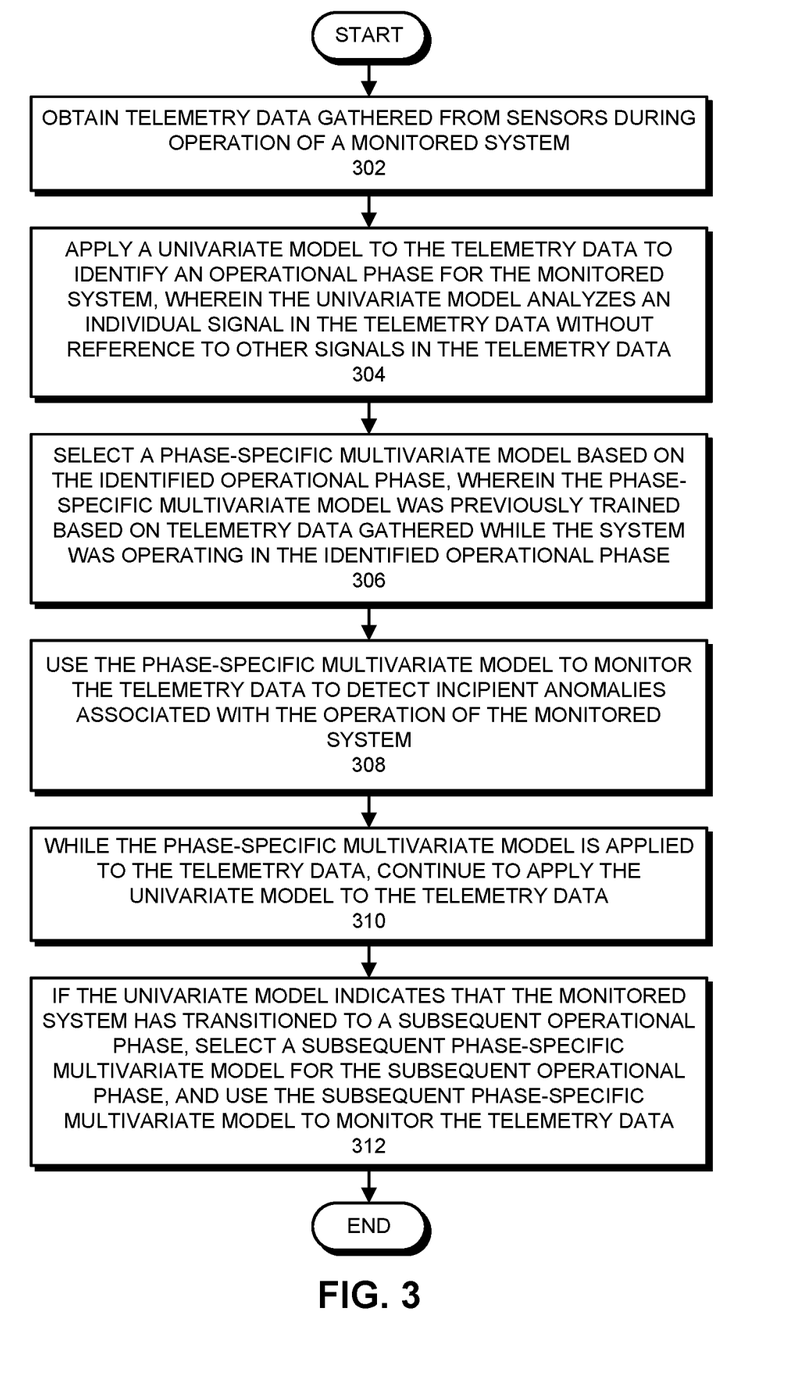
FIG. 3 presents a flowchart illustrating how an exemplary hybrid univariate/multivariate prognostic-surveillance system operates in accordance with the disclosed embodiments.

FIG. 3 presents a flowchart illustrating how an exemplary hybrid univariate/multivariate prognostic-surveillance system operates in accordance with the disclosed embodiments. First, the system obtains telemetry data gathered from sensors during operation of a monitored system (step 302). Next, the system applies a univariate model to the telemetry data to identify an operational phase for the monitored system, wherein the univariate model analyzes an individual signal in the telemetry data without reference to other signals in the telemetry data (step 304). The system then selects a phase-specific multivariate model based on the identified operational phase, wherein the phase-specific multivariate model was previously trained based on telemetry data gathered while the system was operating in the identified operational phase (step 306). Next, the system uses the phase-specific multivariate model to monitor the telemetry data to detect incipient anomalies associated with the operation of the monitored system (step 308).

While the phase-specific multivariate model is applied to the telemetry data, the system continues to apply the univariate model to the telemetry data (step 310). If the univariate model indicates that the monitored system has transitioned to a subsequent operational phase, the system selects a subsequent phase-specific multivariate model for the subsequent operational phase, and uses the subsequent phase-specific multivariate model to monitor the telemetry data (step 312).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for analyzing telemetry data, comprising:
   identifying a plurality of operational phases of a monitored system during training of the monitored system;
   training a plurality of phase-specific multivariate models, wherein each operational phase has a corresponding phase-specific multivariate model;
   saving the plurality of phase-specific multivariate models to a trained-model library;
   obtaining telemetry data gathered from sensors during operation of the monitored system;
   applying a univariate model to the telemetry data to identify an operational phase of the monitored system, wherein the univariate model analyzes an individual signal in the telemetry data without reference to other signals in the telemetry data;
   selecting a phase-specific multivariate model from the trained-model library based on the identified operational phase from the univariate model, wherein the phase-specific multivariate model was previously trained based on telemetry data gathered while the system was operating in the identified operational phase;
   using the phase-specific multivariate model to monitor the telemetry data to detect incipient anomalies associated with the operation of the monitored system including anomalies that were unknown when the telemetry data was originally ingested, thereby integrating a univariate time-series prognostic technique with an advanced multivariate prognostic technique; and
   wherein while the phase-specific multivariate model is applied to the telemetry data;
     continuing to apply the univariate model to the telemetry data;
     when the univariate model indicates that the monitored system has transitioned to a subsequent operational phase, selecting a subsequent phase-specific multivariate model for the subsequent operational phase, and
     using the subsequent phase-specific multivariate model to monitor the telemetry data.

2. The method of claim 1, wherein obtaining the telemetry data involves obtaining the telemetry data from a database while processing a database query, wherein the telemetry data was originally ingested into the database from a monitored system with no real-time anomaly detection.

3. The method of claim 1, wherein applying the univariate model to the telemetry data involves applying multiple univariate models to the telemetry data to identify the operational phase for the monitored system.

4. The method of claim 1, wherein the univariate model comprises a Symbolic Aggregate approXimation (SAX) univariate time-series classifier.

5. The method of claim 1, wherein the phase-specific multivariate model comprises a model that uses a nonlinear, nonparametric (NLNP) regression technique.

6. The method of claim 1, wherein the phase-specific multivariate model comprises a model that uses the multivariate state estimation technique (MSET).

7. The method of claim 1, wherein the telemetry data includes one or more of the following:
   data gathered from physical sensors in the monitored system;
   software-related telemetry parameters gathered from software in the monitored system; and
   control inputs for the monitored system.

8. The method of claim 1, further comprising using the phase-specific multivariate model to distinguish sensor degradation from real process anomalies.

9. A non-transitory computer-readable storage medium storing instructions that when executed by a computer cause the computer to perform a method for analyzing telemetry data, the method comprising:
   identifying a plurality of operational phases of a monitored system during training of the monitored system;
   training a plurality of phase-specific multivariate models, wherein each operational phase has a corresponding phase-specific multivariate model;
   saving the plurality of phase-specific multivariate models to a trained-model library;
   obtaining telemetry data gathered from sensors during operation of the monitored system;
   applying a univariate model to the telemetry data to identify an operational phase for the monitored system, wherein the univariate model analyzes an individual signal in the telemetry data without reference to other signals in the telemetry data;
   selecting a phase-specific multivariate model from the trained-model library based on the identified operational phase from the univariate model, wherein the phase-specific multivariate model was previously trained based on telemetry data gathered while the system was operating in the identified operational phase;
   using the phase-specific multivariate model to monitor the telemetry data to detect incipient anomalies associated with the operation of the monitored system including anomalies that were unknown when the telemetry data was originally ingested, thereby integrating a univariate time-series prognostic technique with an advanced multivariate prognostic technique; and
   wherein while the phase-specific multivariate model is applied to the telemetry data;
      continuing to apply the univariate model to the telemetry data,
      when the univariate model indicates that the monitored system has transitioned to a subsequent operational phase, selecting a subsequent phase-specific multivariate model for the subsequent operational phase, and
      using the subsequent phase-specific multivariate model to monitor the telemetry data.

10. The non-transitory computer-readable storage medium of claim 9, wherein obtaining the telemetry data involves obtaining the telemetry data from a database while processing a database query, wherein the telemetry data was originally ingested into the database from a monitored system with no real-time anomaly detection.

11. The non-transitory computer-readable storage medium of claim 9, wherein applying the univariate model to the telemetry data involves applying multiple univariate models to the telemetry data to identify the operational phase for the monitored system.

12. The non-transitory computer-readable storage medium of claim 9, wherein the univariate model comprises a Symbolic Aggregate approXimation (SAX) univariate time-series classifier.

13. The non-transitory computer-readable storage medium of claim 9, wherein the phase-specific multivariate model comprises a model that uses a nonlinear, nonparametric (NLNP) regression technique.

14. The non-transitory computer-readable storage medium of claim 9, wherein the phase-specific multivariate model comprises a model that uses the multivariate state estimation technique (MSET).

15. The non-transitory computer-readable storage medium of claim 9, wherein the telemetry data includes one or more of the following:
   data gathered from physical sensors in the monitored system;
   software-related telemetry parameters gathered from software in the monitored system; and
   control inputs for the monitored system.

16. A system that analyzes telemetry data, comprising:
   a memory;
   a processor; and
   a non-transitory computer-readable storage medium storing instructions that when executed on the processor cause the system to instantiate;
   a detection mechanism that uses a prognostic-surveillance technique to detect incipient anomalies that arise during execution of a monitored system, wherein during operation, the detection mechanism:
      identifying a plurality of operational phases of a monitored system during training of the monitored system;
      training a plurality of phase-specific multivariate models, wherein each operational phase has a corresponding phase-specific multivariate model;
      saving the plurality of phase-specific multivariate models to a trained-model library;
      obtains telemetry data gathered from sensors during operation of the monitored system;
      applies a univariate model to the telemetry data to identify an operational phase for the monitored system, wherein the univariate model analyzes an individual signal in the telemetry data without reference to other signals in the telemetry data;
      selects a phase-specific multivariate model from the trained-model library based on the identified operational phase from the univariate model, wherein the phase-specific multivariate model was previously trained based on telemetry data gathered while the system was operating in the identified operational phase;
      uses the phase-specific multivariate model to monitor the telemetry data to detect incipient anomalies associated with the operation of the monitored system including anomalies that were unknown when the telemetry data was originally ingested, thereby integrating a univariate time-series prognostic technique with an advanced multivariate prognostic technique; and
      wherein while the phase-specific multivariate model is applied to the telemetry data, the detection mechanism:
         continuing to apply the univariate model to the telemetry data,
         when the univariate model indicates that the monitored system has transitioned to a subsequent operational phase, selects a subsequent phase-specific multivariate model for the subsequent operational phase, and uses the subsequent phase-specific multivariate model to monitor the telemetry data.

\* \* \* \* \*

UNITED STATES PATENT AND TRADEMARK OFFICE
CERTIFICATE OF CORRECTION

PATENT NO. : 10,699,007 B2  
APPLICATION NO. : 15/457523  
DATED : June 30, 2020  
INVENTOR(S) : Kenny C. Gross et al.

Page 1 of 1

It is certified that error appears in the above-identified patent and that said Letters Patent is hereby corrected as shown below:

In the Claims

In Claim 1 (at Column 8, Line 40), please delete the word "data;" and please insert the word --data:--

In Claim 1 (at Column 8, Line 42), please delete the word "data;" and please insert the word --data,--

In Claim 9 (at Column 9, Line 26), please delete the word "data;" and please insert the word --data:--

In Claim 16 (at Column 10, Line 26), please delete the word "instantiate;" and please insert the word --instantiate:--

In Claim 16 (at Column 10, Line 31), please delete the word "identifying" and please insert the word --identifies--

In Claim 16 (at Column 10, Line 34), please delete the word "training" and please insert the word --trains--

In Claim 16 (at Column 10, Line 37), please delete the word "saving" and please insert the word --saves--

In Claim 16 (at Column 10, Line 61), please delete the word "wherein"

In Claim 16 (at Column 10, Line 64), please delete the word "continuing" and please insert the word --continues--

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*